United States Patent Office 2,841,532 Patented July 1, 1958

1

2,841,532

FERMENTATION PROCESS FOR THE PRODUCTION OF L-LYSINE

Donald A. Kita, Jackson Heights, and Hsing T. Huang, Fresh Meadows, N. Y., assignors to Chas. Pfizer & Co., Inc., Brooklyn, N. Y., a corporation of Delaware No Drawing. Application October 18, 1956 Serial No. 616,590

2 Claims. (Cl. 195—30)

This invention is concerned with a novel process for the preparation of the essential amino acid L-lysine (hereinafter referred to simply as lysine). More particularly, it is concerned with the production of lysine by a fermentation method suitable for large scale commercial use.

In copending application Serial No. 551,987, filed on December 9, 1955, by Lester Earl Casida, Jr., now U. S. Patent 2,771,396, issued November 20, 1956, there is described a fermentation process for the production of lysine. The process there described requires inoculation with two separate organisms. It has now been discovered that surprisingly enough it is possible to prepare lysine by a fermentation process employing a single organism as inoculum. This present invention is the first time that lysine has been prepared from simple carbon sources by a fermentation employing only one organism as inoculum.

The organism employed in this invention is a mutant of *Escherichia coli* which initially, i. e. at the beginning of the fermentation, lacks the enzyme diaminopimelic acid decarboxylase and is unable to grow without the presence of lysine in the nutrient medium. Such mutant organisms may be produced by methods well known in the art. For example, the penicillin method described by Davis in Nature, volume 169, page 535 (1952), is useful for this purpose. A growing culture of a mutant strain of *E. coli* which has been found to carry out the reaction of this invention in good yield has been deposited with the American Type Culture Collection in Washington, D. C., and added to their permanent collection, where it has been given the number ATCC 12,408.

In carrying out the process of this invention, a nutrient medium is inoculated with a mutant strain of *E. coli* which requires lysine for its growth. This nutrient medium may vary considerably in composition. It should contain a source of carbohydrate, for example crude molasses or dextrose, sources of trace minerals, such as magnesium sulfate, a source of nitrogen such as ammonium hydrogen phosphate, and some lysine. The presence of glycerine in the reaction medium is also extremely helpful. In general, from about 1% to 8% of glycerine is useful. The initial concentration of lysine in the original fermentation broth is of critical importance. This concentration should be within the limits of from about 0.1 to 0.5 g./l. In general, the very best results are obtained with ordinary nutrient media when the lysine concentration is between 0.20 and 0.25 g./l. This range, however, may vary somewhat with the particular mutant strain of *E. coli* employed, and it also varies somewhat with the other constituents of the medium. In general, when the medium contains a very high quantity of utilizable sources of food energy, that is when the medium is rich in nutrients from such sources as carbohydrates, amino acids other than lysine, and organic acids, the lysine concentration may be somewhat higher than when less rich media are used. While the maximum amount of lysine increases when the richness of the nutrient medium increases, the relationship cannot be expressed as a simple direct proportion, but only stated in general terms.

2

The fermentation is best conducted at a temperature of about 28° C., although this temperature may be varied somewhat. For a period of from 36 to 60 hours after the broth has been inoculated with the organism, fermentation is conducted under submerged, aerobic conditions. Stirring is desirable, for example at a rate of about 1750 revolutions/minute and aeration is carried out at the rate of about one volume of air/volume of reaction mixture/minute. At the end of this time, the fermentation broth is rich in diaminopimelic acid. Samples may be taken periodically and assayed for concentration of diaminopimelic acid. It is advisable to allow the fermentation to continue for a period of several hours after the concentration of diaminopimelic acid reaches a maximum since during this additional time the concentration of diaminopimelic acid does not decrease, but the concentration of the enzyme diaminopimelic acid decarboxylase increases. About 5 to 24 hours after the concentration of diaminopimelic acid has reached a maximum, the next step is carried out. This next step is adjusting the pH to between 7.2 and 8.2 by adding alkali, preferably ammonium hydroxide, and rupturing the cell membrane of the organism present in the broth. This is done by any of the standard methods, such as treatment with solvents like benzene or xylene, treatment with ultrasonic energy, and preferably by treatment with toluene. A volume of toluene from about 1 to 5% of the total volume of the broth gives good results. The reaction is then allowed to continue for at least about 12 hours more, after which time the diaminopimelic acid has been converted in extremely high yield to the desired product lysine. During this second period of fermentation it is preferred that aerobic conditions be maintained for best results. For example, gentle stirring under nitrogen is employed, or the mixture is allowed to stand still in deep tanks.

It is essential that before the second stage of the fermentation the cell wall of the organism be ruptured. The enzyme system is intercellular and must be liberated to carry out the next reaction. It is also essential that the pH be adjusted to within the specified range, since the enzyme system is most active in that range.

The lysine is then recovered from the fermentation mixture by filtering off the solid materials, passing the filtrate through a strong cation exchange resin, such as the sulfonic acid resin Amberlite IR–120 (trademark of Rohm & Haas Co.) which absorbs the lysine. The lysine is then eluted from the resin by dilute alkali, such as ammonium hydroxide, potassium hydroxide or sodium hydroxide.

The theoretical explanation for the outstanding results obtained with this process is not known with complete certainty. It can be said, however, that the process involves the back mutation of the mutant *E. coli*, which at the beginning of the fermentation was not capable of producing the enzyme diaminopimelic acid decarboxylase. After a period of growth on the nutrient medium of this invention, the organism back mutates and becomes capable of producing the enzyme. When the cell wall of the organism is ruptured, for example by the addition of toluene, this enzyme is liberated and converts the diaminopimelic acid to lysine. The presence of lysine in the original fermentation broth, besides enabling the organism to grow, appears to retard its back mutation and allow diaminopimelic acid to accumulate. However, it is necessary that the organism back mutate eventually, in order that it produce the diaminopimelic acid decarboxylase necessary to convert the diaminopimelic acid to lysine. When the lysine level in the nutrient medium at the beginning of the fermentation is too high, the diaminopimelic acid formed is not converted to lysine. When the initial lysine level is too low, very little or no diaminopimelic acid is formed at all. This is the probable explanation for the critical importance of controlling the initial concentration of lysine in the fermentation mixture. This explanation is also consistent with the data reported by Elizabeth Work in "A Symposium on Amino Acid Metabolism," p. 475 (1955), The Johns Hopkins Press, Baltimore, where the experiments involved lysine levels much below those necessary for the process of this invention. Regardless of theory, what is of importance is the fact that in view of the teachings of the present invention, it is now for the first time possible to make lysine from simple carbon sources by a fermentation process employing but a single organism as inoculum. It is also noteworthy that the present invention is the first case in which a fermentation process has been carried out making use of the back mutation of an organism.

The following examples are given solely for the purpose of illustration and are not to be construed as limitations of this invention, many variations of which are possible without departing from the spirit or scope thereof.

*Example I*

*E. coli* ATCC 12,408 was grown on a previously sterilized aqueous nutrient medium having the following composition:

| | G./l. |
|---|---|
| Magnesium sulfate heptahydrate | 0.2 |
| Citric acid | 2.0 |
| $K_2HPO_4$ | 10.0 |
| $Na(NH_4)HPO_4$ | 3.5 |
| Lysine hydrochloride | 0.4 |
| Dextrose hydrate | 10.0 |

pH adjusted to 7.5 with potassium hydroxide.

After 18 hours of growth, 100 cc. of this inoculum was added to two liters of the following aqueous nutrient medium which had previously been sterilized:

| | G./l. |
|---|---|
| Sugar beet molasses | 40 |
| Glycerine | 30 |
| $(NH_4)_2HPO_4$ | 20 |
| Magnesium sulfate heptahydrate | 0.5 |
| Lysine | 0.2 |

pH adjusted to 7.5 with ammonium hydroxide.

After growing at 28° C. for 44 hours with stirring and aeration, the broth had a concentration of 7.0 g./l. of diaminopimelic acid. The pH of the broth was then adjusted to 8.0 with ammonium hydroxide, and toluene in a volume equal to 2% of the volume of the broth was admixed. The mixture was then allowed to stand for 40 hours more, at the end of which time the diaminopimelic acid had been converted to lysine in 100% yield. The fermentation broth was then filtered and the filtrate was adjusted to pH 2 with $H_2SO_4$ and then passed over Amberlite IR-120 which absorbed the lysine. The lysine was eluted by treatment with a dilute solution of ammonium hydroxide. The elutate was evaporated to drive off the ammonia, then acidified with hydrochloric acid to a pH of 4.9, and lysine hydrochloride recovered by crystallization.

*Example II*

An experiment was conducted as described in Example I, except that the fermentation medium had the following composition:

| | G./l. |
|---|---|
| Lysine | 0.1 |
| Sucrose | 15 |
| Glycerine | 15 |
| $(NH_4)_2HPO_4$ | 15 |
| $Na_2HPO_4$ | 5 |
| Lactic acid | 4 |
| $MgSO_4.7H_2O$ | 0.5 |
| $Na_2SO_4$ | 0.1 |

pH adjusted to 7.8 with KOH.

The fermentation was run as in Example I for 56 hours, at which time the diaminopimelic acid concentration of the broth was 5.0 g./l. After adjustment of the pH and rupture of the cell wall as in Example I, the mixture was allowed to stand for 12 hours, at the end of which time the diaminopimelic acid had been converted to lysine in 100% yield.

*Example III*

Experiments were conducted as described in Example I with no changes except that the fermentation medium had, in addition to the amounts of lysine shown in the table below, the following composition:

| | G./l. |
|---|---|
| Sugar beet molasses | 50 |
| Glycerine | 40 |
| $(NH_4)_2HPO_4$ | 20 |
| $MgSO_4.7H_2O$ | 0.5 |

pH adjusted to 7.8 with KOH.

The following table shows the initial concentration of lysine in the fermentation medium, the concentration of diaminopimelic acid obtained, and the percent conversion of diaminopimelic acid to lysine.

| Initial Conc. of Lysine, g./l. | Diaminopimelic Acid Conc., g./l. | Percent Conversion |
|---|---|---|
| 0.10 | 4.0 | 100 |
| 0.22 | 8.6 | 100 |
| 0.25 | 9.2 | 100 |
| 0.28 | 10.0 | 50 |
| 0.50 | 10.0 | 10 |

What is claimed is:

1. A process for the preparation of L-lysine, which process comprises fermenting a nutrient medium initially containing from about 0.1 to about 0.5 gram of L-lysine per liter, with a mutant of *E. coli* which initially requires L-lysine for growth, under submerged, aerobic conditions, adjusting the pH to between 7.2 and 8.2, rupturing the cell wall of the organism, and then continuing the reaction under anerobic conditions.

2. A process for the preparation of L-lysine, which process comprises fermenting, with a mutant of *E. coli* which initially requires L-lysine for growth, a nutrient medium initially containing from about 0.2 to about 0.25 gram of L-lysine per liter, under submerged, aerobic conditions for from about 36 to 60 hours, adjusting the pH to between 7.2 and 8.2 by adding ammonium hydroxide, rupturing the cell wall of the organism by treating the mixture with toluene, and continuing the reaction for at least 12 additional hours under anerobic conditions.

References Cited in the file of this patent

UNITED STATES PATENTS 2,771,396 Casida Nov. 20, 1956

OTHER REFERENCES

"Advances in Enzymology," vol. 16, pages 297 to 299.